United States Patent
Kaufmann et al.

(10) Patent No.: US 9,623,358 B2
(45) Date of Patent: Apr. 18, 2017

(54) FILTER SYSTEM HAVING A SUPPORT TUBE

(71) Applicant: MANN+HUMMEL GMBH, Ludwigsburg (DE)

(72) Inventors: Michael Kaufmann, Meckenheim (DE); Klaus-Dieter Ruhland, Meckenheim (DE); Reinhard Oelpke, Harthausen (DE)

(73) Assignee: MANN+HUMMEL GMBH, Ludwigsburg (DE)

( * ) Notice: Subject to any disclaimer, the term of this patent is extended or adjusted under 35 U.S.C. 154(b) by 70 days.

(21) Appl. No.: 14/474,499

(22) Filed: Sep. 2, 2014

(65) Prior Publication Data

US 2015/0059302 A1    Mar. 5, 2015

Related U.S. Application Data

(60) Provisional application No. 62/038,312, filed on Aug. 17, 2014, provisional application No. 62/038,575, (Continued)

(30) Foreign Application Priority Data

Sep. 2, 2013   (DE) .......................... 10 2013 014 488
Sep. 2, 2013   (DE) .......................... 10 2013 014 489
(Continued)

(51) Int. Cl.
*B01D 46/24*      (2006.01)
*B01D 46/52*      (2006.01)
(Continued)

(52) U.S. Cl.
CPC ...... *B01D 46/2411* (2013.01); *B01D 46/0001* (2013.01); *B01D 46/0002* (2013.01);
(Continued)

(58) Field of Classification Search
CPC ............ B01D 46/0002; B01D 46/0004; B01D 46/0021; B01D 46/0024; B01D 46/2411;
(Continued)

(56) References Cited

U.S. PATENT DOCUMENTS 4,720,292 A    1/1988   Engel et al.
5,695,633 A   12/1997   Ernst et al.
(Continued)

FOREIGN PATENT DOCUMENTS

WO     2008045326 A2    4/2008

*Primary Examiner* — Robert Clemente
(74) *Attorney, Agent, or Firm* — James Hasselbeck

(57) ABSTRACT

A filter system has a housing with a housing wall and at least one cover. An inlet port is arranged on the housing and supplies a fluid to be filtered to the housing. An outlet port is arranged on the housing and discharges the fluid that has been filtered from the housing. A support tube is arranged in an interior of the housing and accommodates a filter element. The support tube extends along a housing axis of the housing and has a receiving side, wherein the support tube is connected to the housing by a first detent connection provided on the receiving side.

13 Claims, 13 Drawing Sheets

Related U.S. Application Data filed on Aug. 18, 2014, provisional application No. 62/038,601, filed on Aug. 18, 2014, provisional application No. 62/038,920, filed on Aug. 19, 2014, provisional application No. 62/038,672, filed on Aug. 18, 2014, provisional application No. 62/038,869, filed on Aug. 19, 2014.

(30) Foreign Application Priority Data

| Sep. 2, 2013 | (DE) | ......................... 10 2013 014 491 |
| Sep. 2, 2013 | (DE) | ......................... 10 2013 014 492 |
| Sep. 2, 2013 | (DE) | ......................... 10 2013 014 493 |
| Sep. 2, 2013 | (DE) | ......................... 10 2013 014 507 |

(51) Int. Cl.

| *B01D 46/00* | (2006.01) |
| *F02M 35/024* | (2006.01) |
| *F02M 35/02* | (2006.01) |
| *F02M 35/022* | (2006.01) |
| *F02M 35/09* | (2006.01) |

(52) U.S. Cl.

CPC ..... *B01D 46/0004* (2013.01); *B01D 46/0005* (2013.01); *B01D 46/0021* (2013.01); *B01D 46/0027* (2013.01); *B01D 46/0046* (2013.01); *B01D 46/0086* (2013.01); *B01D 46/2414* (2013.01); *B01D 46/521* (2013.01); *B01D 46/522* (2013.01); *F02M 35/0203* (2013.01); *F02M 35/024* (2013.01); *F02M 35/0216* (2013.01); *F02M 35/0223* (2013.01); *F02M 35/02416* (2013.01); *F02M 35/02483* (2013.01); *F02M 35/09* (2013.01); *B01D 2265/06* (2013.01); *Y10T 29/49826* (2015.01)

(58) Field of Classification Search

CPC .......... B01D 46/2414; B01D 2265/028; B01D 2265/06; F02M 35/02416; F02M 35/02425; F02M 35/02483

See application file for complete search history.

(56) References Cited

U.S. PATENT DOCUMENTS 5,730,769 A * 3/1998 Dungs ................ B01D 46/0024
123/198 E
7,390,407 B2 6/2008 Weindorf et al.

\* cited by examiner

FILTER SYSTEM HAVING A SUPPORT TUBE

CROSS-REFERENCE TO RELATED APPLICATIONS

This application claims the benefit of German patent application Nos. 10 2013 014 488.4, filed Sep. 2, 2013; 10 2013 014 489.2, filed Sep. 2, 2013; 10 2013 014 507.4, filed Sep. 2, 2013; 10 2013 014 492.2, filed Sep. 2, 2013; 10 2013 014 491.4, filed Sep. 2, 2013; and 10 2013 014 493.0, filed Sep. 2, 2013. The entire contents of the aforesaid German patent applications being incorporated herein by reference and to the fullest extent of the law.

This application claims the benefit of U.S. provisional patent application Nos. 62/038,312, filed: Aug. 17, 2014; 62/038,575, filed: Aug. 18, 2014; 62/038,601, filed: Aug. 18, 2014; 62/038,920, filed: Aug. 19, 2014; 62/038,672, filed: Aug. 18, 2014 and 62/038,869, filed Aug. 19, 2014. The entire contents of the aforesaid provisional patent applications being incorporated herein by reference and to the fullest extent of the law.

BACKGROUND OF THE INVENTION

The invention relates to a filter system having a support tube for accommodating a replaceable filter element, in particular for use as an air filter of an internal combustion engine.

An air filter system is known from WO 2008/045326 A2, having a support tube, as part of the filter system housing, which has a closed end cap. The support tube supports the filter element and prevents rotation of the filter element during operation of the filter system. The support tube is connected to the housing via a snap connection by means of attachment tabs which engage in openings in the housing. When the attachment tabs are snapped into the openings, the support tube may be regarded as part of the housing. It is thus possible to use the support tube for accommodating the filter element, which is thus situated to prevent twisting. After removal of the filter element, the support tube may be detached from this snap connection by, for example, tilting the support tube against the housing, which is intentionally or unintentionally possible during replacement of the filter element.

The object of the invention, therefore, is to provide a filter system having a support tube, whereby the support tube is fixedly connected to the housing in a simple and cost-effective manner so as to prevent twisting.

SUMMARY OF THE INVENTION

According to one aspect of the invention, the above-mentioned object is achieved by using a filter system which has a support tube that is connected to the housing via a detent connection.

Advantageous embodiments and advantages of the invention result from the further claims, the description, and the drawings.

A filter system is proposed in which the filter system comprises a housing having a housing wall and at least one cover, an inlet port situated on the housing for supplying a fluid to be filtered, in particular air, an outlet port situated on the housing for discharging the filtered fluid, and a support tube, situated in the interior of the housing, for accommodating a filter element. The support tube extends along a housing axis and is connected to the housing via a detent connection on a receiving side.

The approach according to the invention has the advantage over the prior art that the detent connection allows an arrangement of a support element in the housing of a filter system which is fixed, i.e., not detachable without destruction, and at the same time is prevented from twisting. In addition, a coupling between the support tube fixed to the housing and the housing, and also between a secondary element and the support tube fixed to the housing, at the correct angle are conceivable as another embodiment.

In contrast to a detachable connection, unintentional removal of the support tube while replacing filter elements is not possible without destroying the component. In addition, twisting of the support tube in the event of vibration excitation, for example during operation of an internal combustion engine in a motor vehicle, is not possible due to the anti-twist protection.

A coupling at the correct angle may be provided between the housing and the support tube and also between a secondary element and the support tube, thus ensuring a clearly defined position of the three components, namely, the housing, support tube, and secondary element, with respect to one another. It is thus possible to improve in particular the quality of the signal of an air mass meter, for example a hot film air mass meter (HFM), in the clean air region of the filter system due to the constant flow field in the clean air region, which otherwise may be influenced by a modified geometry of the relative positions of the housing, support tube, and/or secondary element with respect to one another. Measurements using HFM sensors are typically conducted very close to the outlet of a filter system, as the result of which the measurements may be greatly influenced by a varying flow field. When structural components of a filter system, such as the support tube and/or secondary element, which usually are not completely rotationally symmetrical due to seams of filter media, reinforcing ribs, and the like, are now installed in different angular positions, the resulting flow field may have a varying nature, and may thus influence the measurement by the HFM sensor.

The detent connection may preferably be formed from corresponding detent elements on the housing and on the support tube. A clearly defined association of the support tube and the housing is thus possible, so that the risk of incorrect parts being used during the installation is minimized.

The fact that the detent connection has a design that is not detachable without destruction may be particularly advantageous. Manipulation or misuse, for example during replacement of a filter element on the filter system, is thus easily recognizable. In addition, due to the necessity of exerting fairly large forces, the likelihood of unintentionally removing the support tube is decreased, thus reducing inadvertent contamination of the clean air region during replacement of the filter element.

In one advantageous embodiment, a collar having a circumferential design, at least in segments, and at least one retaining tab facing the collar may be provided as part of the detent connection. A secure connection may be established between the support tube and the housing due to the cooperation of the retaining tab and the circumferential collar with the particular corresponding detent elements of the respective other component which is part of the detent connection, such as the housing and/or the support tube.

The retaining tab may advantageously have a retaining surface that is situated perpendicularly with respect to the housing axis. A relatively large force is thus necessary to detach the retaining tab from a locking position, and it is possible to provide a reliable connection between the involved components. The retaining tabs advantageously have insertion bevels so that they may be easily guided over their corresponding detent element. However, due to the perpendicular configuration of the retaining surfaces, it is no longer possible to detach the locked connection without destruction.

The housing, as part of the detent connection on a collar having a circumferential design, at least in segments, may advantageously have at least one inwardly facing retaining tab with a retaining surface that is situated perpendicularly with respect to the housing axis. A secure connection may be established between the support tube and the housing due to the locking of the retaining tab with a retaining tab and a circumferential collar of the support tube.

As a corresponding detent element, the support tube, as part of the detent connection on a circumferential collar, may have an outwardly facing retaining tab with a retaining surface that is situated perpendicularly with respect to the housing axis, and the support tube having a securing element by means of which the detent connection may be secured from coming loose. Due to the locking of the retaining tab with a retaining tab and a circumferential collar of the housing, a secure connection, which is also secured by a securing element against unintentional detachment, may be established between the support tube and the housing.

In an alternative embodiment, the detent elements of the housing and the support tube may have a mirror-image design, so that the support tube, as part of the detent connection on a circumferential collar, has at least one inwardly facing retaining tab with a retaining surface that is situated perpendicularly with respect to the housing axis.

Correspondingly, the housing, as part of the detent connection on a circumferential collar, may have an outwardly facing retaining tab with a retaining surface that is situated perpendicularly with respect to the housing axis, and in addition the housing may have a securing element, so that the detent connection may be secured from coming loose. This embodiment of the detent connection functions in exactly the same way as the above-described embodiment; only the corresponding detent elements are interchanged.

In the approach according to the invention, the support tube may advantageously be axially mountable at the correct angle relative to the housing axis. The detent elements may be designed in such a way that respectively corresponding detent elements may be locked to one another only in a defined manner, for example due to different spacings of the detent elements on a circumferential collar, and thus may be mounted only in one angular direction. As a result, according to the so-called poka-yoke principle the support tube is mountable only in a fixed position in the housing which is always the same.

Furthermore, the anti-twist protection may be additionally achieved by the interlocking of ribs on the receiving side of the support tube with webs on the collar of the housing wall, in that the ribs engage between the webs of the housing when the support tube is inserted and locked in the housing, and are thus protected from twisting.

In one advantageous embodiment, a secondary element may be situated in the interior of the support tube, and may extend along the housing axis and be connectable to the support tube and/or the housing via a detent connection. The secondary element may, for example, be connected to the support tube itself with a detent connection that is similar to that of the support tube to the housing, and may thus likewise have an easily and securely mountable design. The securing element may be dispensed with in a design in which the secondary element is to be replaceable during maintenance operations.

As a result of mounting the secondary element in the interior of the support tube, the secondary element may be prevented from falling out or being unintentionally pulled out when the filter element is removed during maintenance. The clean air region of the air conduction system in an internal combustion engine is thus protected from contamination during replacement of the filter element.

The secondary element may advantageously be axially mountable at the correct angle relative to the housing axis and/or the support tube. As the result of an appropriate design of the detent elements with different spacings, the secondary element as well may be mountable only in a fixed angular position. The secondary element may thus be installed in only one position according to the poka-yoke principle.

In one advantageous refinement, the secondary element is mountable at the correct angle relative to the housing axis and/or the support tube. For this purpose, an alignment element may be situated on a receiving side of the secondary element, and a counterelement may be situated on the support tube, so that anti-twist protection of the secondary element which is mounted in the housing and/or in the support tube may be provided.

In one advantageous embodiment, at least one alignment element may be situated on the receiving side of the support tube, and a counterelement may be situated on the housing, so that anti-twist protection of the support tube mounted in the housing may be provided. Due to such an alignment element, for example a rib, which corresponds only to its respective counterelement, for example a groove, a fixed mounting of the support tube at the correct angle may be achieved. The support tube may thus be installed only in one position according to the poka-yoke principle. In addition, the support tube is no longer able to twist in its installed position. If the alignment element does not engage with its corresponding counterelement, for example the support tube is not able to lock in the detent connection. Installation in a defined angular position may be ensured in this way. The embodiments described in the previous five paragraphs, in conjunction with a support tube which is fixed to the housing and connected to the housing, in one piece and formed from the same material, by a single injection molding operation, or welding or adhesive bonding to the housing, also represent an independent invention for which protection is claimed herein.

Thus, the invention further relates to a filter system comprising a housing having a housing wall and at least one cover, an inlet port, situated on the housing, for supplying a fluid to be filtered, in particular air, an outlet port, situated on the housing, for discharging the filtered fluid, and a support tube, situated in the interior of the housing, for accommodating a filter element, wherein the support tube extends along a housing axis and is connected to the housing, a secondary element is situated in the interior of the support tube, and the secondary element extends along the housing axis and is connectable to the support tube and/or the housing via a detent connection. The filter system may likewise advantageously have at least one of the advantageous features described above or below.

The invention further relates to a secondary element for use in a filter system according to one of the preceding claims, wherein the secondary element extends along the housing axis, and includes a gridded tube-shaped support body and a filter medium which annularly encloses the support body at end edges which are joined together in a seam area.

In one advantageous embodiment of a secondary element, the end edges are joined together in a seam area by means of an ultrasonic weld seam, an adhesive track, a metal clamp, or other means, thus forming an annularly closed filter body. The seam area is preferably situated radially outside, preferably directly on, a longitudinal rib of the support body which in particular is continuous.

In another advantageous embodiment, the secondary element has detent means for forming a detent connection with the support tube and/or the housing.

BRIEF DESCRIPTION OF THE DRAWINGS

Further advantages result from the following description of the drawings. Exemplary embodiments of the invention are illustrated in the drawings. The drawings, the description, and the claims contain numerous features in combination. Those skilled in the art will also advantageously consider the features individually and combine them into further meaningful combinations.

Identical or similar components are denoted by the same reference numerals in the figures. The figures merely show examples, and are not to be construed as limiting.

DESCRIPTION OF PREFERRED EMBODIMENTS

Figure 1:
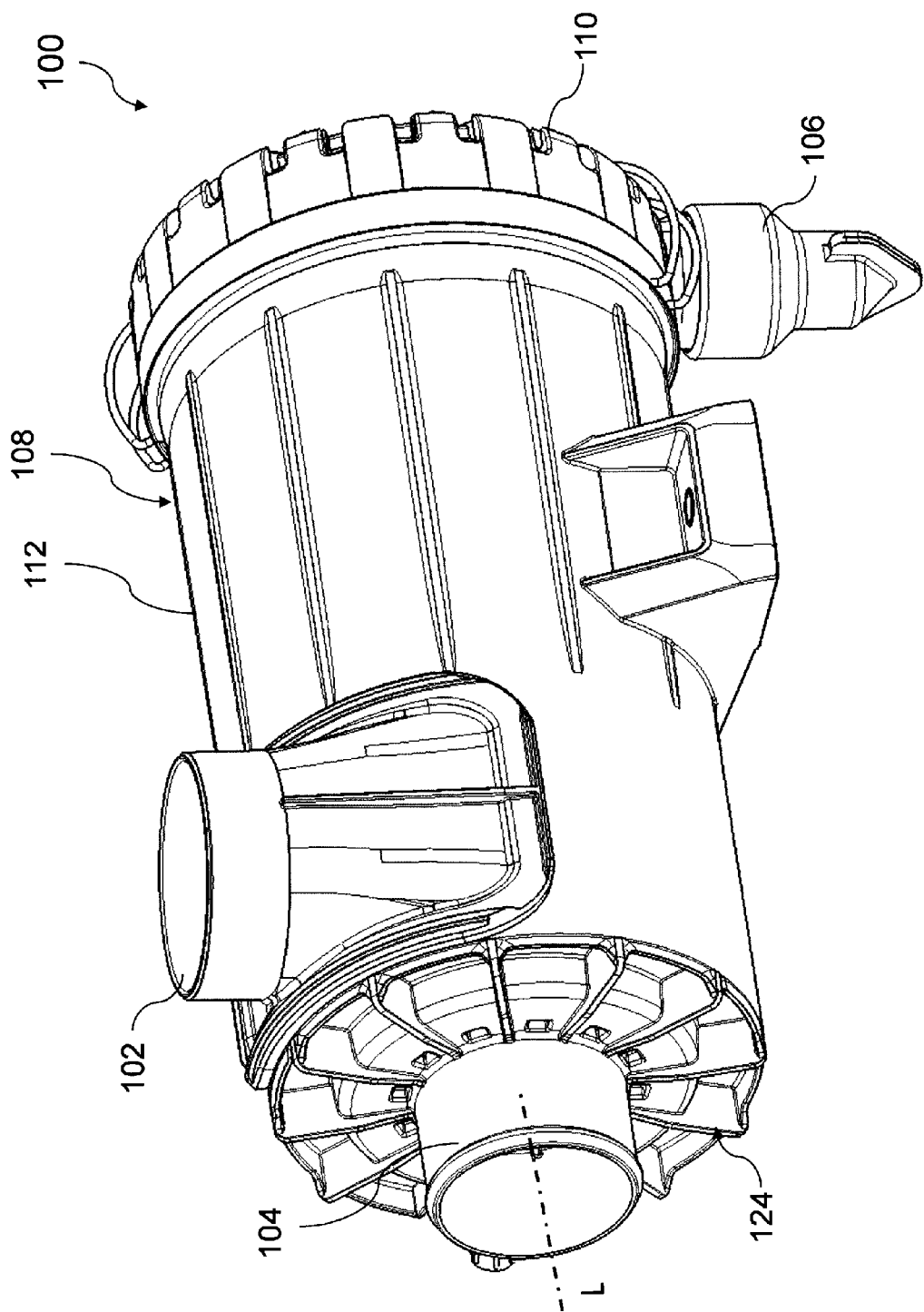
FIG. 1 shows a perspective view of a two-stage filter system having a cyclone separator according to one exemplary embodiment of the invention.

FIG. 1 shows a perspective view of a two-stage filter system 100 having a cyclone separator 50 according to one exemplary embodiment of the invention, with a tangential inlet 102, a central outlet port 104 on a housing end-face side 124, and a dirt outlet 106 on the bottom side. A circular filter construction is illustrated, comprising a housing 108 which has a housing wall 112 and which is closed by a cover 110, for example with a screw or bayonet lock. For use as an air filter system, dust-laden air flows into the inlet 102, which is situated tangentially with respect to the internally installed air filter element, so that the air inside the housing 108 is set into rotational motion by an inflow protection element on the filter element. The filter element and the inflow protection element are not illustrated in the drawing. Centrifugal forces act on the dust particles in the flowing air due to the cyclone effect caused by the rotational motion of the air, so that the dust particles are partially deposited on the housing wall and are able to flow out of the filter system 100 via the dirt outlet 106. The filter element is thus subjected to less load, and the service life of the filter element is increased. The cleaned air may be discharged from the housing 108 via the central outlet 104.

Filter systems of this type, as illustrated in FIG. 1, are typically used as air filters and/or particle filters, in particular for internal combustion engines in the construction machinery and agricultural machinery sectors. These filter systems are characterized by a high level of robustness, and due to the high filter load have short service lives. A filter system 100 with a loaded filter element must be able to tolerate a weight increase of 10 kg or more.

Figure 2:
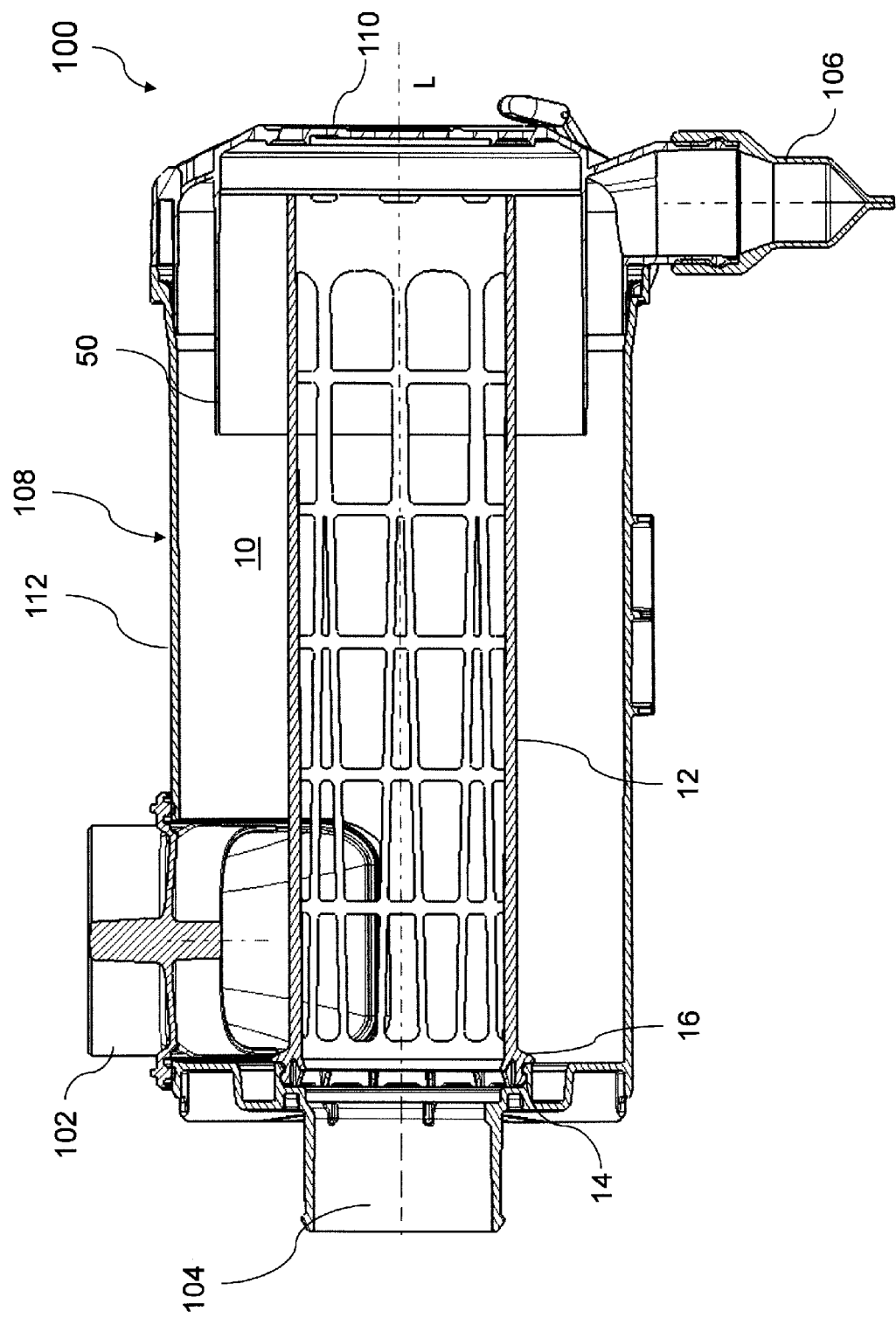
FIG. 2 shows a longitudinal section of the filter system of FIG. 1 with an inserted support tube.

FIG. 2 illustrates a longitudinal section of the filter system 100 in FIG. 1 with an inserted support tube 12. The filter system 100 includes a housing 108 having a housing wall 112 and a cover 110, an inlet port 102 situated on the housing 108 for supplying a fluid to be filtered, in particular air, an outlet port 104 situated on the housing 108 for discharging the filtered fluid, and a support tube 12, situated in the interior 10 of the housing 108, for accommodating a filter element. The support tube 12 extends along a housing axis L, and is connected to the housing 108 via a detent connection 14 on a receiving side 16.

Figure 3:
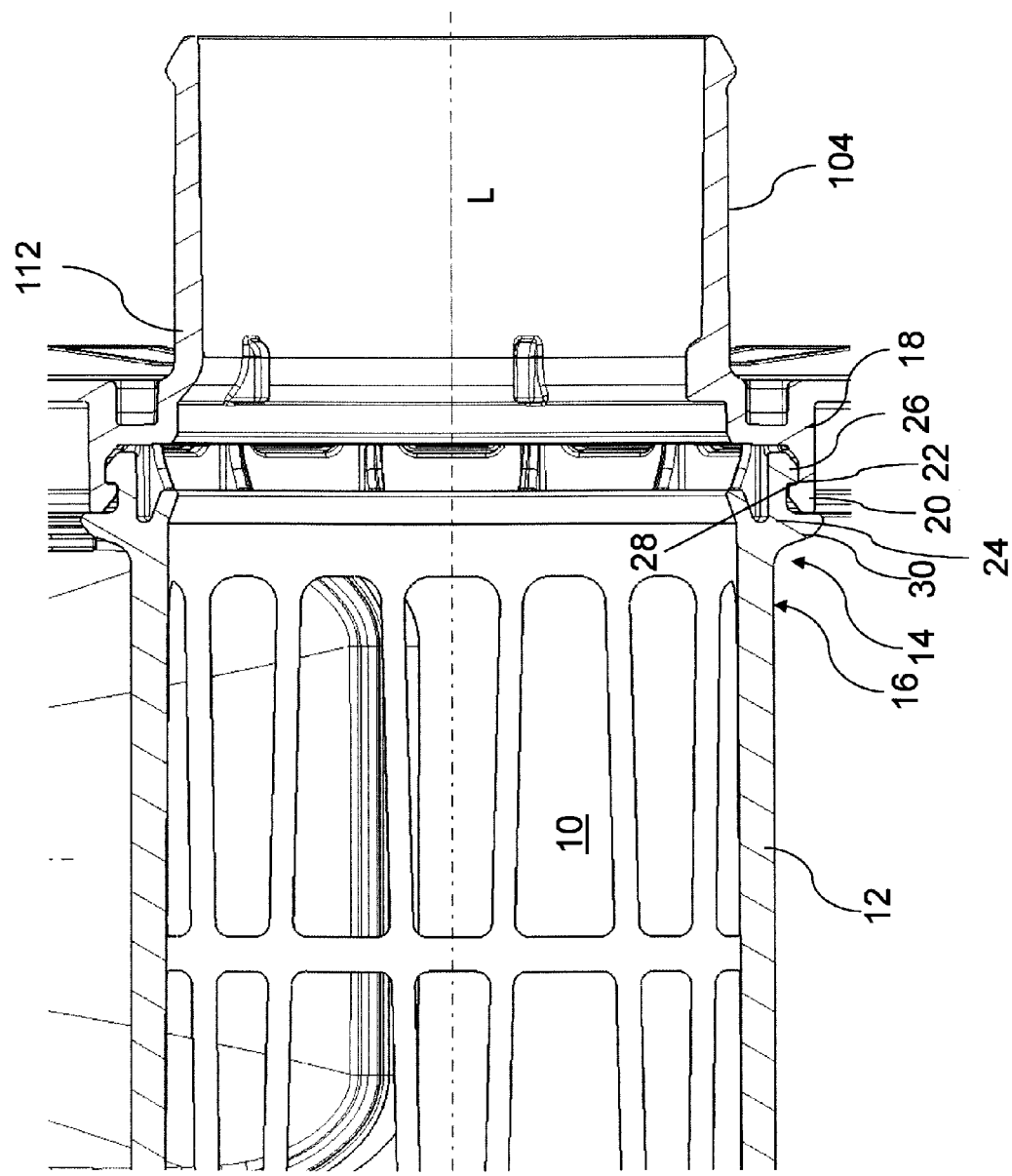
FIG. 3 shows a detailed view of the detent connection between the support tube and the housing according to one exemplary embodiment of the invention.

FIG. 3 shows a detail view of the detent connection 14 between the support tube 12 and the housing 108 according to one exemplary embodiment of the invention, the detent connection 14 being formed from corresponding detent elements 18, 20, 24, 26 on the housing 108 and on the support tube 12. A collar 18, 24 having a circumferential design, at least in segments, and at least one retaining tab 20, 26 facing the collar 18, 24 are provided as part of the detent connection 14. The retaining tabs 20, 26 each have a retaining surface 22, 28, respectively, which is situated perpendicularly with respect to the housing axis L. On a collar 18 having a circumferential design at least in segments, the housing 108 has at least one inwardly facing retaining tab 20 with a retaining surface 22 as part of the detent connection 14, wherein the retaining tab 20 is situated perpendicularly with respect to the housing axis L. Correspondingly, on a circumferential collar 24, the support tube 12 has an outwardly facing retaining tab 26 with a retaining surface 28 as part of the detent connection 14, wherein the retaining tab 24 is situated perpendicularly with respect to the housing axis L. In addition, the support tube 12 has a securing element 30 by means of which the detent connection 14 may be secured against coming loose. A detent connection 14 designed in this way is not detachable without destruction, since, due to the static friction, the securing element 30 prevents the retaining tab 20 from being easily bent outwardly.

In an alternative embodiment, not illustrated, the detent elements between the housing and the support tube may be interchanged, so that the support tube 12 has at least one inwardly facing retaining tab 20 with a retaining surface 22 on a circumferential collar 18 as part of the detent connection 14, wherein the retaining tab 20 is situated perpendicularly with respect to the housing axis L. Correspondingly, the housing 108 then has an outwardly facing retaining tab 26 with a retaining surface 28 on a circumferential collar 24 as part of the detent connection 14, wherein the retaining tab 26 is situated perpendicularly with respect to the housing axis L. In addition, the housing 108 then has a securing element 30 by means of which the detent connection 14 may be secured against coming loose.

Figure 4:
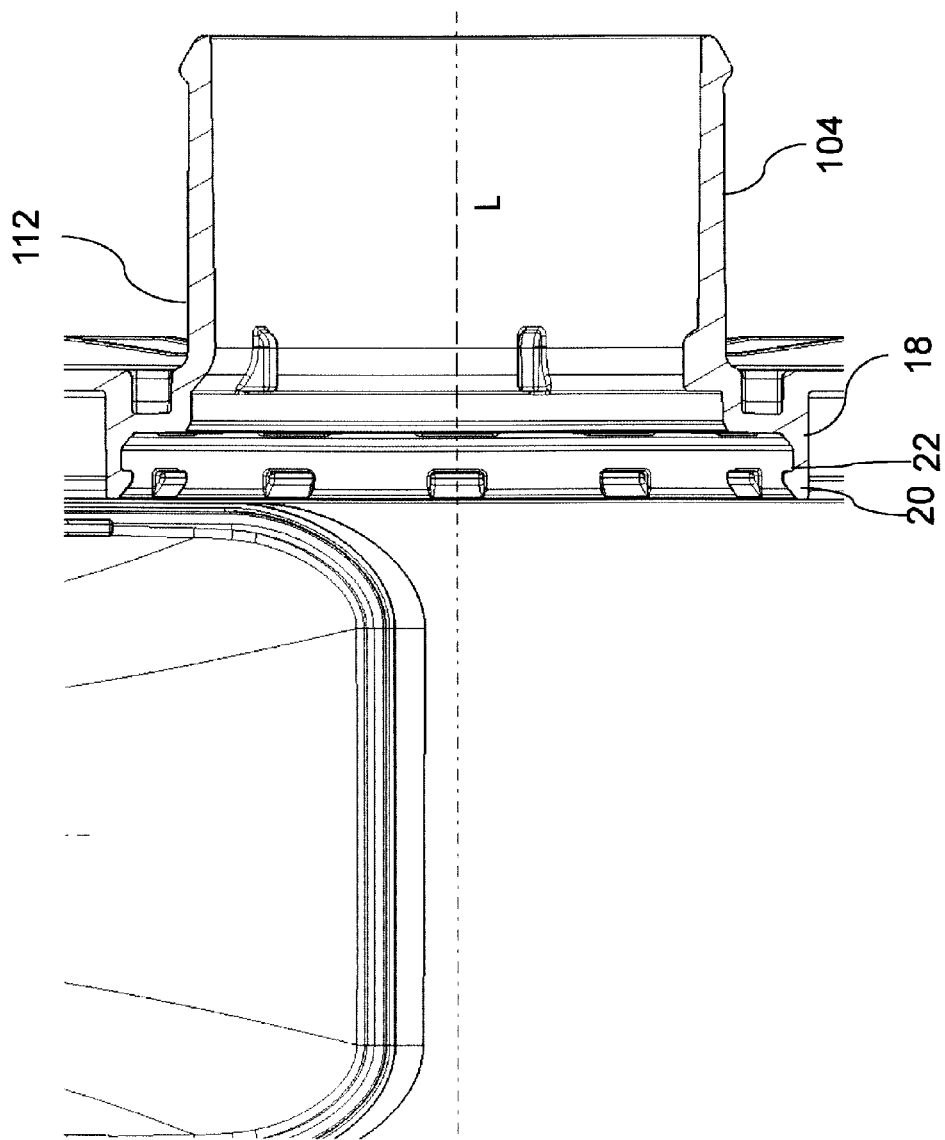
FIG. 4 shows a detailed view of the detent elements of the housing according to one exemplary embodiment of the invention.

FIG. 4 shows a detail view of the detent elements 18, 20, 22 of the housing 108 according to one exemplary embodiment of the invention. The figure shows retaining tabs 20 which are mounted on the housing wall 112 in the immediate vicinity of the outlet port 104, and with retaining surfaces 22 that are situated on a circumferential collar 18.

Figure 5:
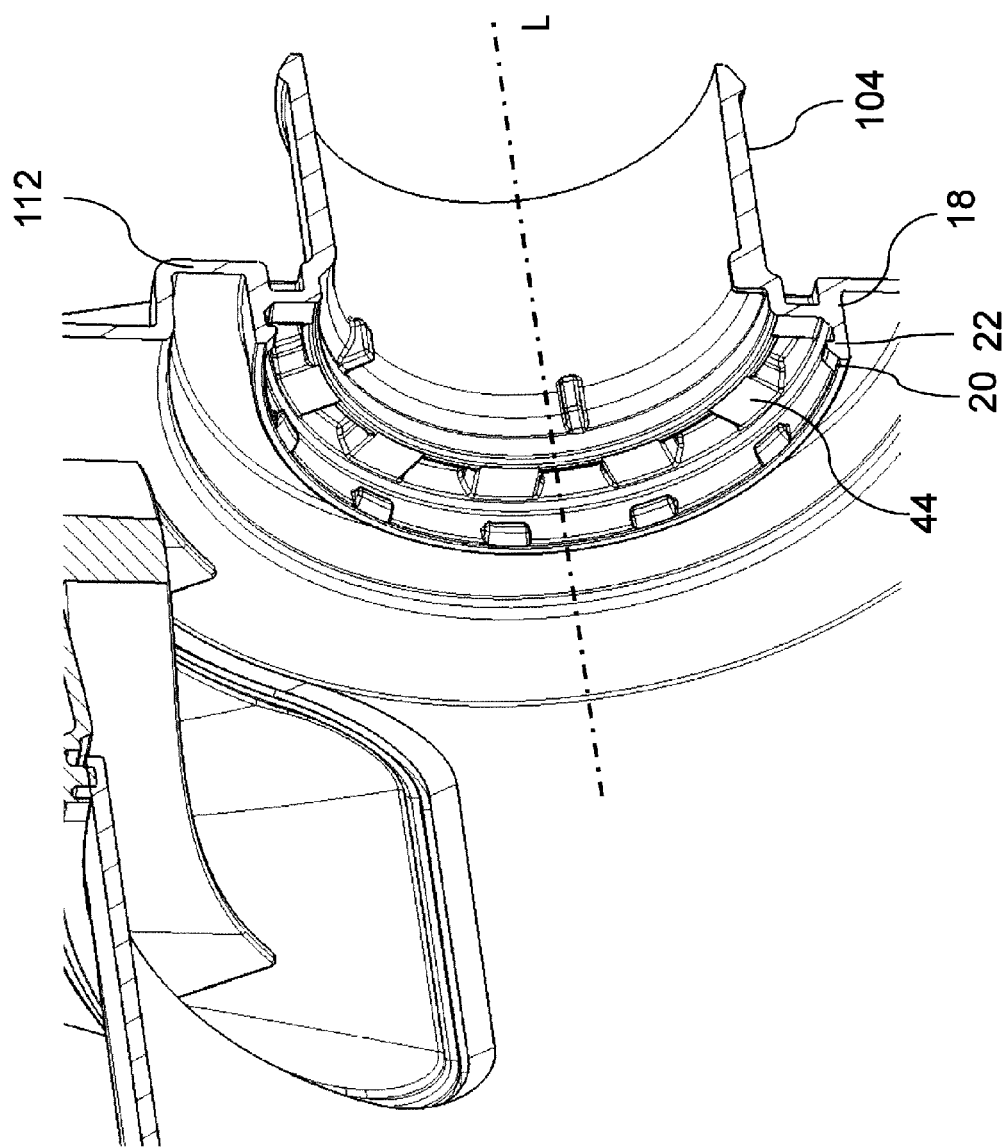
FIG. 5 shows a perspective view of the detent elements of the housing according to one exemplary embodiment of the invention.

FIG. 5 illustrates a perspective view of the detent elements 18, 20, 22 of the housing 108 according to one exemplary embodiment of the invention. It is apparent that the retaining tabs 20 which are mounted on the housing wall 112 in the immediate vicinity of the outlet port 104 together with their retaining surfaces 22 are arranged in a circle on the circumferential collar 18. In addition, webs 44 in which ribs 46 of a support tube 12 are able to engage are attached to the collar 18, thus ensuring additional anti-twist protection for the installed support tube 12.

Figure 6:
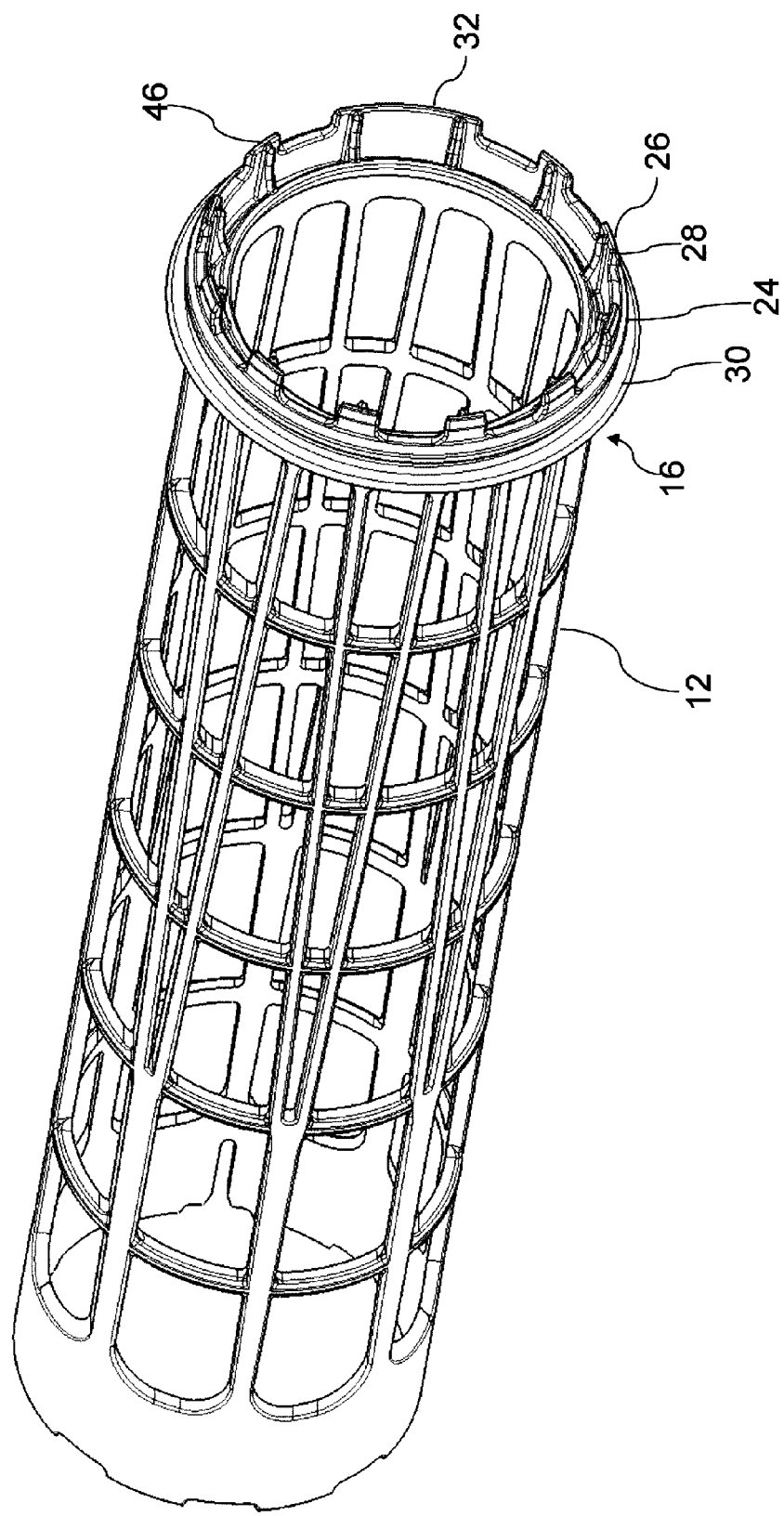
FIG. 6 shows a support tube having detent elements according to one exemplary embodiment of the invention.

FIG. 6 shows a support tube 12 together with the detent elements 24, 26, 28 and the securing element 30 according to one exemplary embodiment of the invention. Retaining tabs 26 with their retaining surfaces 28 are situated on the circumferential collar 24 on the receiving side 16 of the support tube 12. The securing element 30 for securing the detent connection from accidentally coming loose is situated at a distance beneath the retaining tab 26. An alignment element 32 which is used for the fixed mounting of the support tube 12 in the housing 108 at the correct angle is situated on the receiving-side end of the support tube 12. The support tube 12 is thus axially mountable at the correct angle relative to the housing axis L. At least one alignment element 32 is situated on the receiving side 16 of the support tube 12, and a counterelement 33 is situated on the housing 108, so that mounting at the correct angle as well as anti-twist protection of the support tube 12 installed in the housing 108 may be provided. Additional anti-twist protection is achieved via the interlocking of ribs 46 on the receiving side 16 of the support tube 12 with webs 44 on the collar 18 of the housing wall 112.

Figure 7:
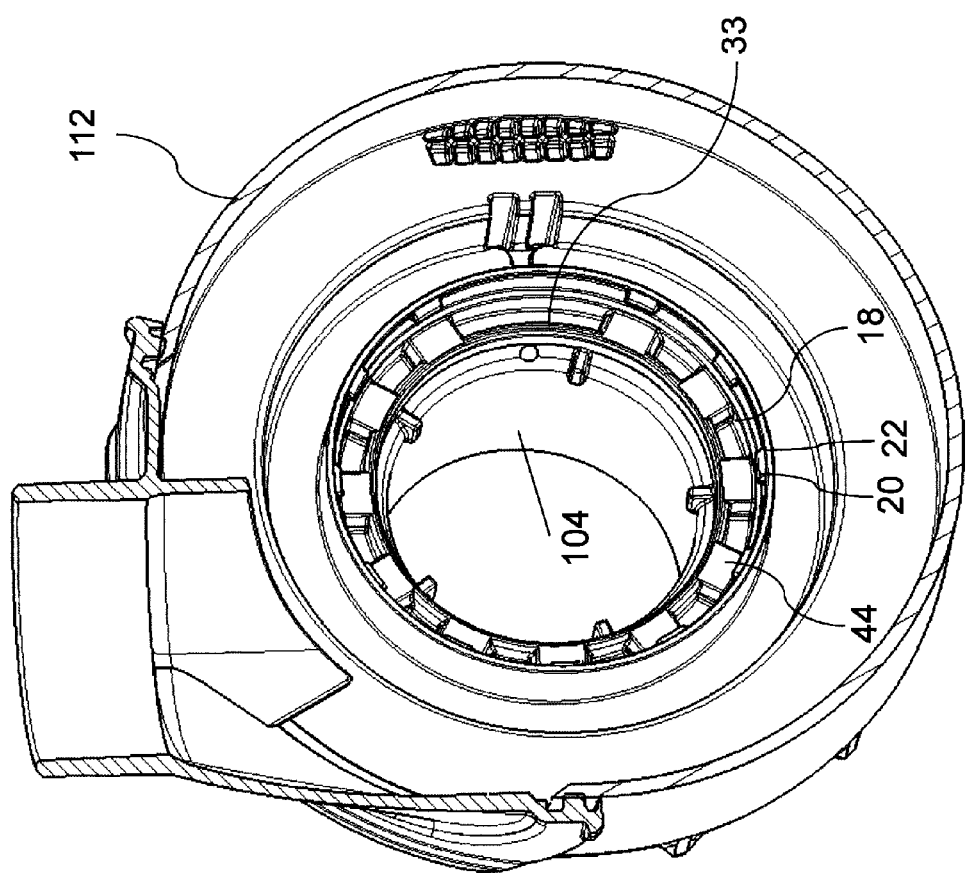
FIG. 7 shows a perspective view of the detent elements of the housing according to one exemplary embodiment of the invention.

FIG. 7 shows a perspective view of the detent elements 18, 20, 22 of the housing 108 according to one exemplary embodiment of the invention. The detent elements, namely, the retaining tab 20 together with the retaining surface 22, are arranged on a circumferential collar 18 at regular intervals, the retaining tabs 20 being situated a farther distance away than the counterelement 33 at a location where the alignment element 32 of the support tube 12 is able to engage, in order to be able to install the support tube 12 at the correct angle.

Figure 8:
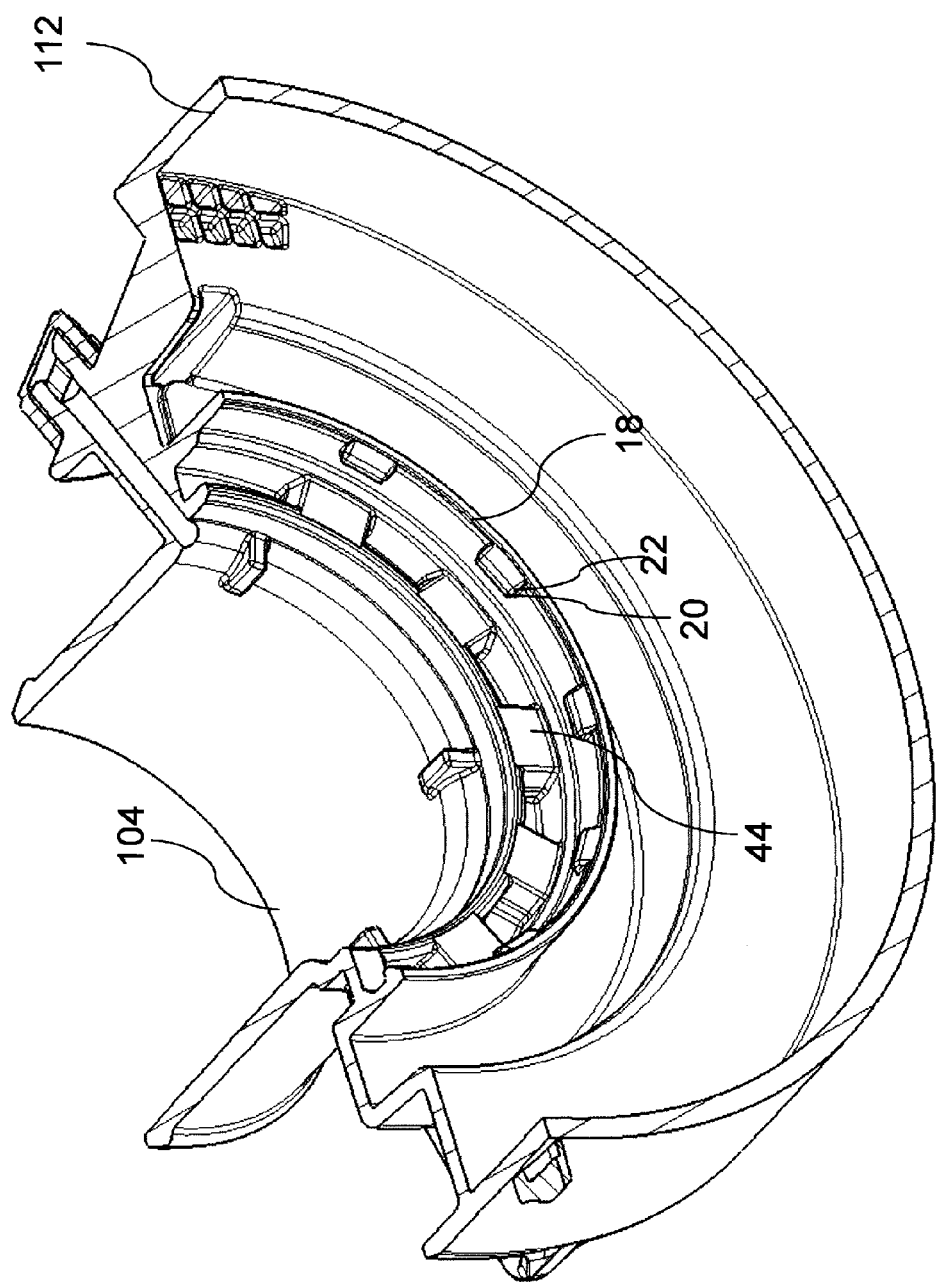
FIG. 8 shows a detailed view of the detent elements of the housing according to one exemplary embodiment of the invention.

FIG. 8 illustrates another detailed perspective view of the detent elements 18, 20, 22 of the housing 108 according to one exemplary embodiment of the invention, showing a clearer view of the spatial configuration of the collar 18 together with the retaining tabs 20 and retaining surfaces 22.

Figure 9:
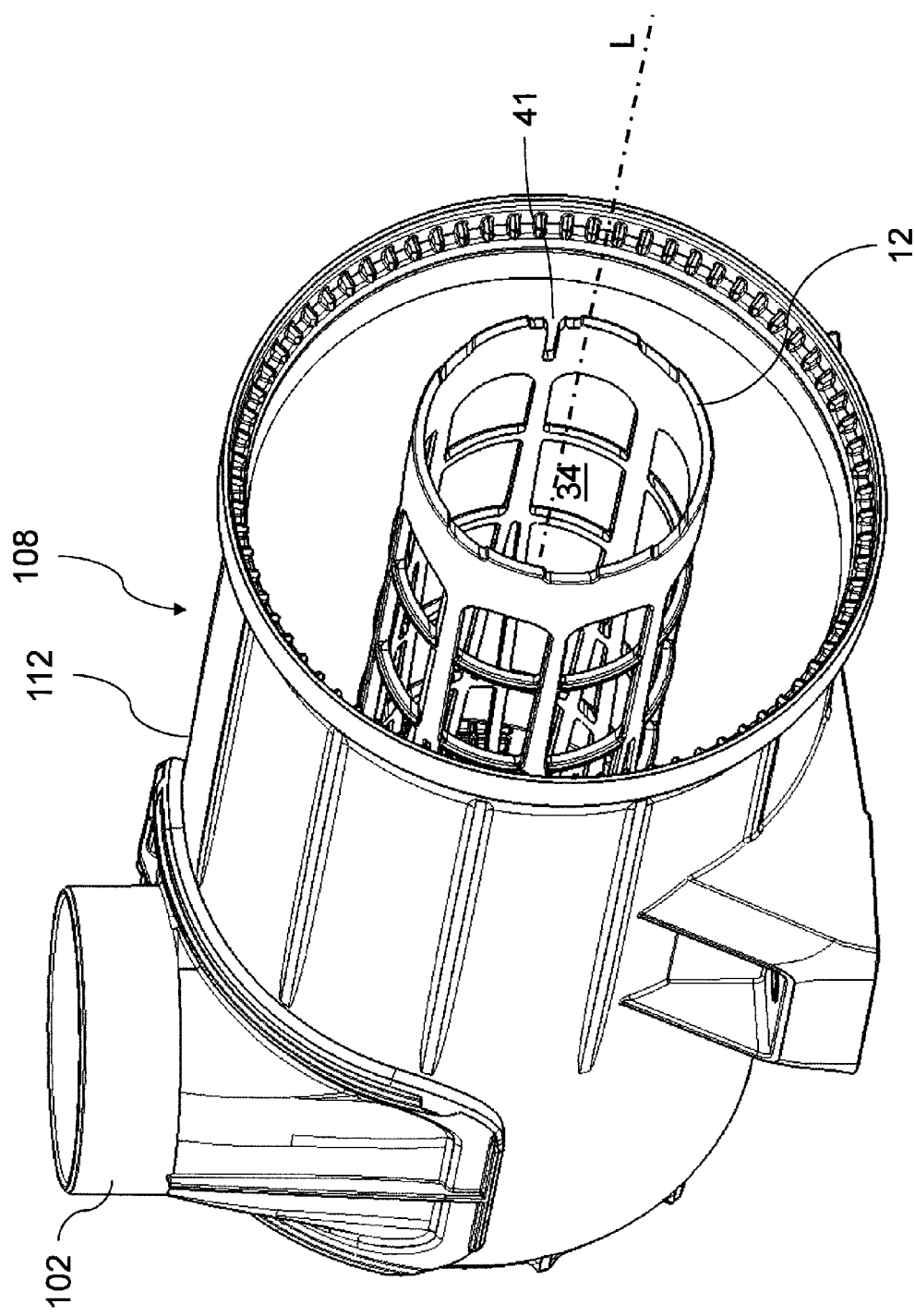
FIG. 9 shows a housing of a filter system with the cover removed and the support tube mounted according to one exemplary embodiment of the invention.

FIG. 9 shows a housing 108 of a filter system 100 with the cover 110 removed and the support tube 12 installed according to one exemplary embodiment of the invention. The support tube 12 is situated inside the housing wall 112, concentrically with respect to the longitudinal axis L of the filter system 100. The support tube 12 has a counterelement 41 on its upper end for mounting a secondary element 36 at the correct angle according to the poka-yoke principle.

Figure 10:
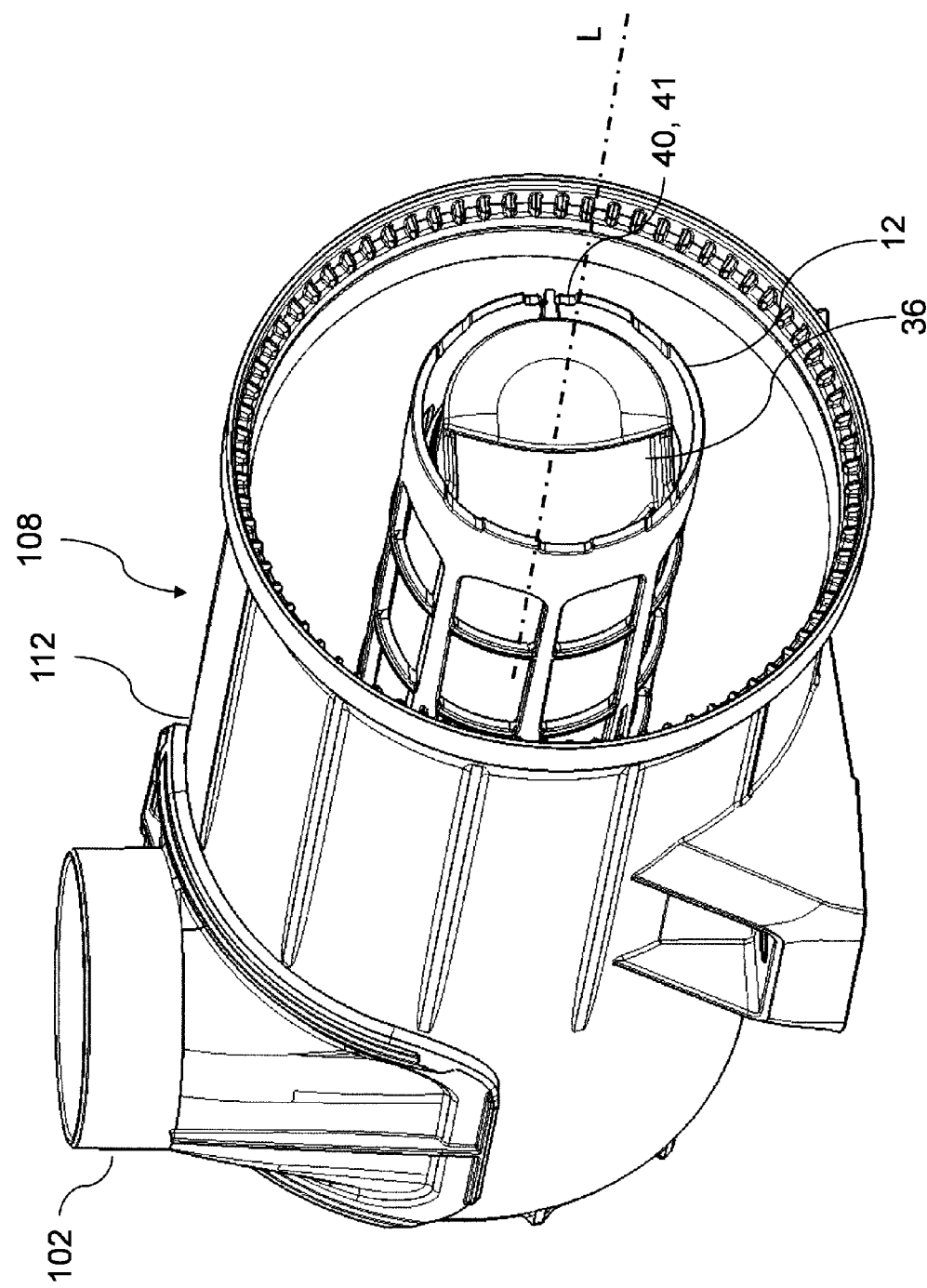
FIG. 10 shows a housing of a filter system with the cover removed and the support tube and secondary element mounted according to one exemplary embodiment of the invention.

FIG. 10 shows a housing 108 of a filter system 100 with the cover 110 removed and the support tube 12 and a secondary element 36 installed according to one exemplary embodiment of the invention. The secondary element 36 is situated in the interior 34 of the support tube 12, and extends along the housing axis L. The secondary element 36 is connected to the support tube 12 and/or the housing 108 via a detent connection 38, and via the connection of the alignment element 40 and the counterelement 41 is axially mounted at the correct angle relative to the housing axis L and/or the support tube 12.

Figure 11:
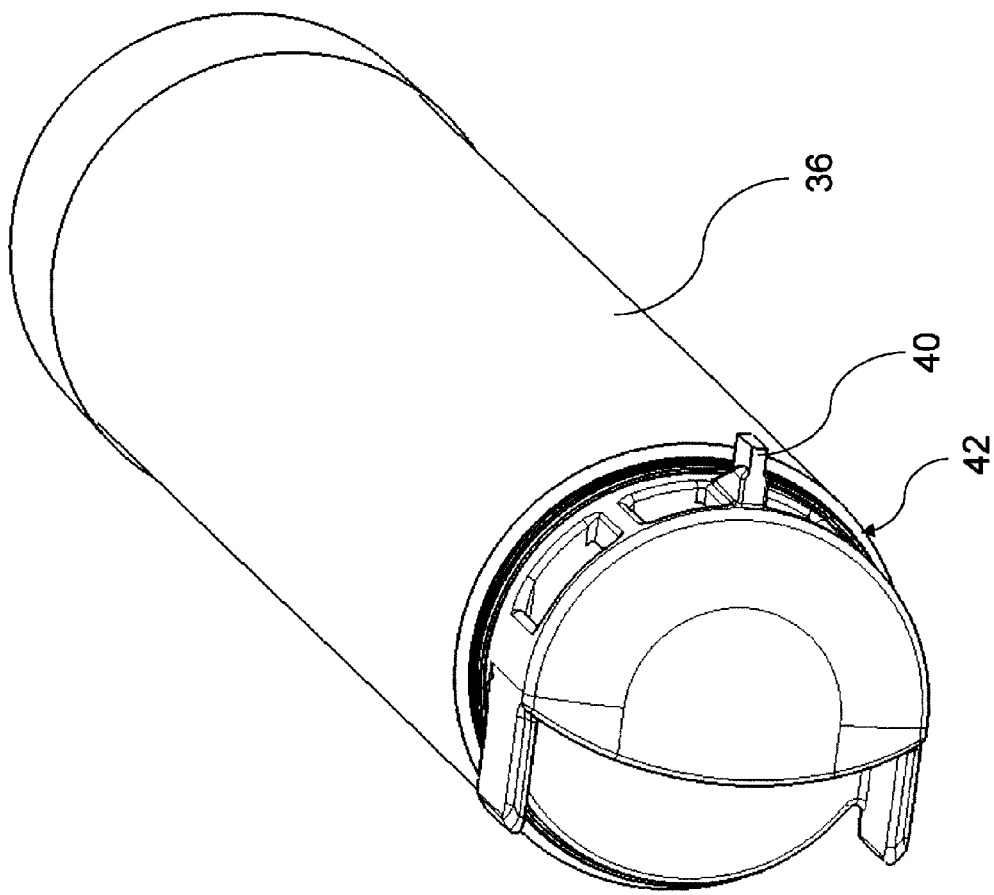
FIG. 11 shows a secondary element according to one exemplary embodiment of the invention.

FIG. 11 shows a secondary element 36 according to one exemplary embodiment of the invention. A protruding rib as an alignment element 40 for mounting in the support tube 12 at the correct angle is apparent at the upper end of the secondary element 36. At least one alignment element 40 is situated on a receiving side 42 of the secondary element 36, and a counterelement 41, for example a groove, is situated on the support tube 12, so that mounting at the correct angle as well as anti-twist protection of the secondary element 36 installed in the housing 108 and/or in the support tube 12 may be provided.

Figure 12:
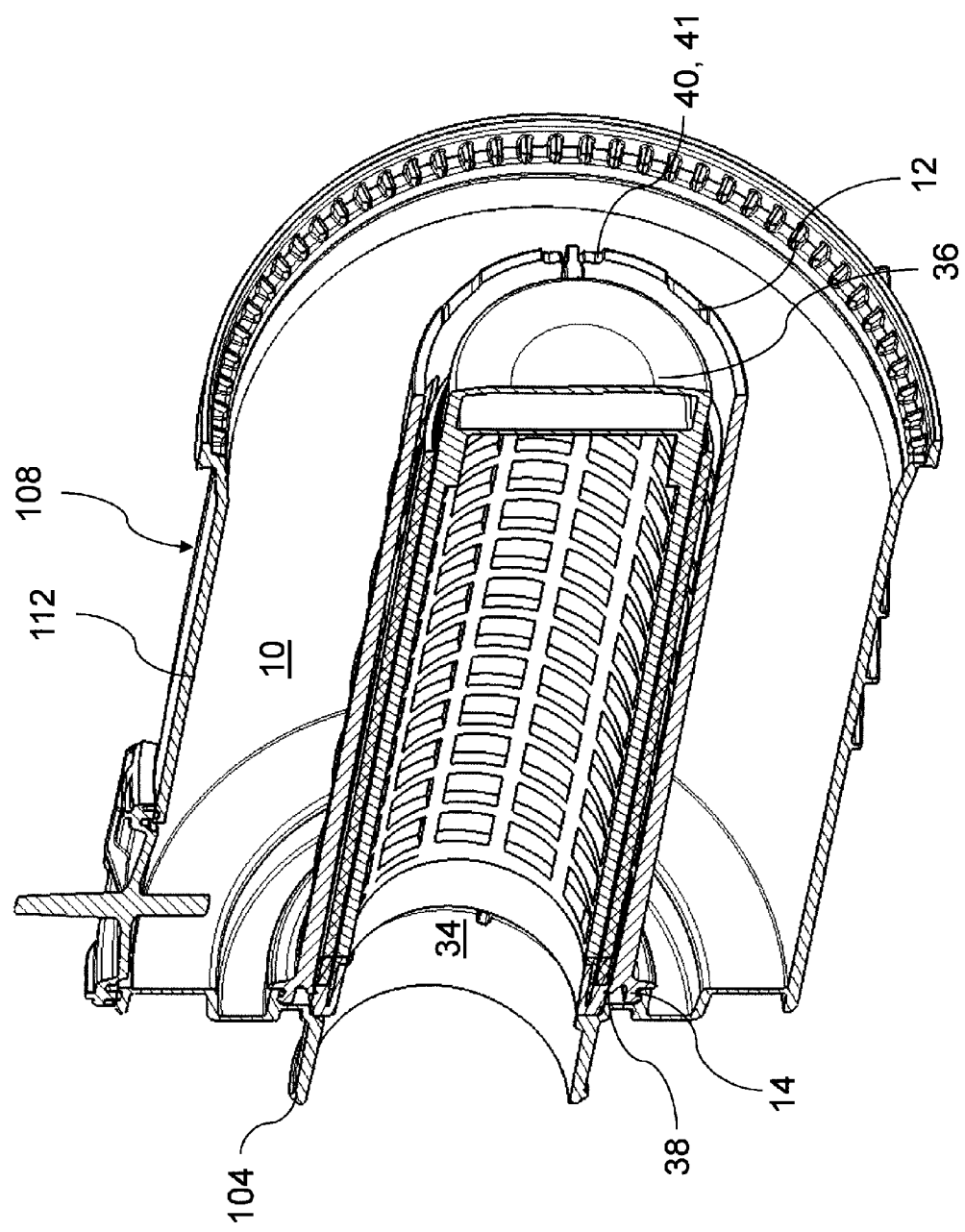
FIG. 12 shows a longitudinal section of a housing of a filter system with the cover removed and the support tube and secondary element mounted according to one exemplary embodiment of the invention.

FIG. 12 shows a longitudinal section of a housing 108 of a filter system 100 with the cover 110 removed and the support tube 12 and a secondary element 36 installed according to one exemplary embodiment of the invention. In the interior 10 of the filter system 100 the support tube 12 is installed on the housing wall 112, above the outlet port 104, via a detent connection 14, while the secondary element 36 is situated in the interior 34 of the support tube 12 via a detent connection 38, the secondary element 36 being mounted at the correct angle in the support tube 12 via the alignment element 40, for example a rib, and its counterelement 41, for example a groove.

Figure 13:
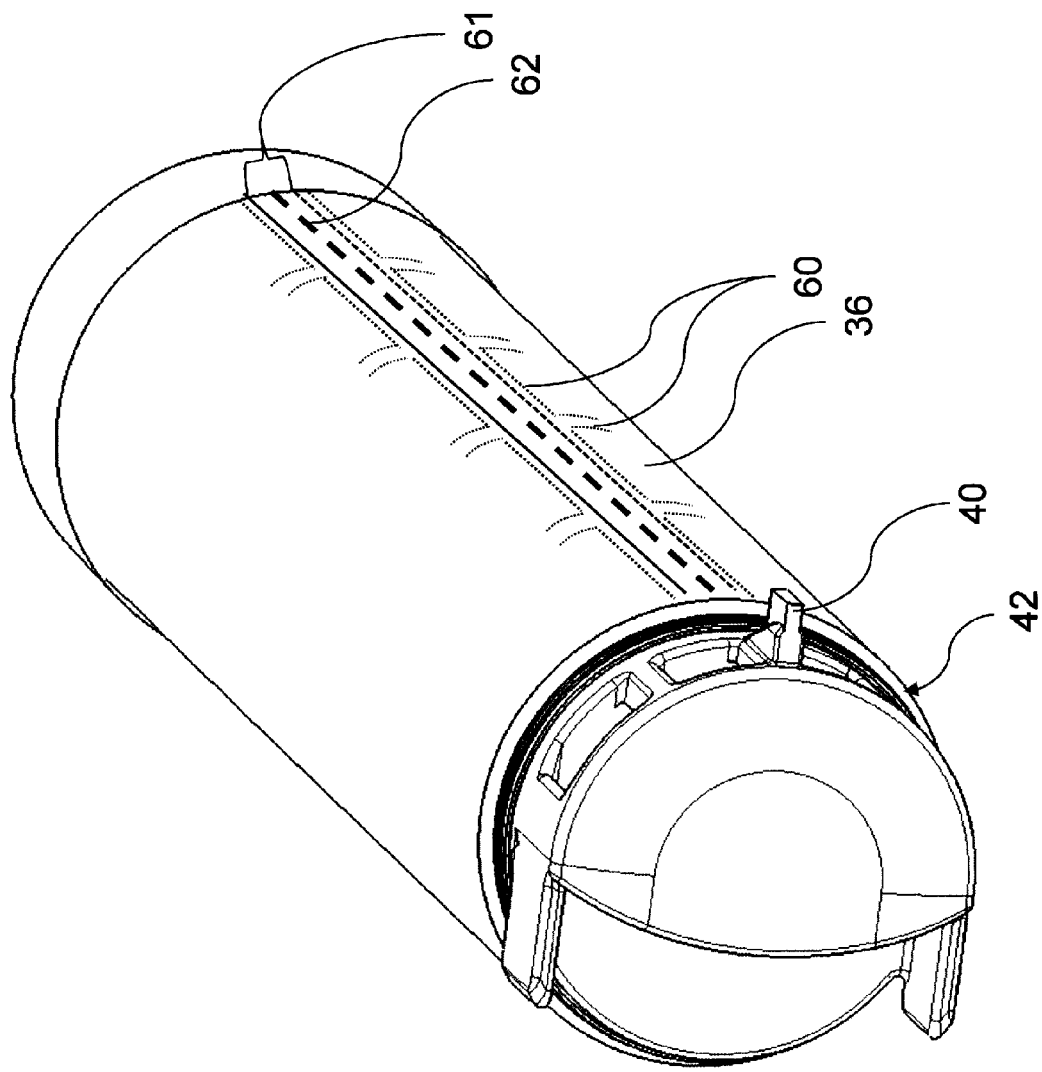
FIG. 13 shows a secondary element according to one exemplary embodiment of the invention.

FIG. 13 shows a secondary element 36 according to one exemplary embodiment of the invention. A protruding rib as an alignment element 40 for mounting in the support tube 12 at the correct angle is apparent at the upper end of the secondary element 36. At least one alignment element 40 is situated on a receiving side 42 of the secondary element 36, and a counterelement 41, for example a groove, is situated on the support tube 12, so that mounting at the correct angle as well as anti-twist protection of the secondary element 36 installed in the housing 108 and/or in the support tube 12 may be provided. The ends of a filter medium, which is annularly situated around a grid-shaped support body 60, partially illustrated by dashed lines here, adjoin one another in the seam area 61, and are preferably situated in an overlapping manner there, as schematically shown in the figure. The ends are joined together at that location by means of an ultrasonic weld seam, an adhesive track, metal clamp, or other means, thus forming an annularly closed filter body. The seam area 61 is preferably situated radially outside, preferably directly on, a longitudinal rib of the support body 60 which in particular is continuous. In the case of a connection by an ultrasonic weld seam or adhesive track, welding or adhesive bonding may take place directly at this longitudinal rib. This has the advantage that the position of the bellows seam 62 is defined, so that it cannot be arbitrarily situated at different angular positions.

While specific embodiments of the invention have been shown and described in detail to illustrate the inventive principles, it will be understood that the invention may be embodied otherwise without departing from such principles.

What is claimed is:

1. A filter system comprising:
a housing comprising a housing wall and at least one cover;
an inlet port arranged on the housing and adapted to supply a fluid to be filtered to the housing;
an outlet port arranged on the housing and adapted to discharge the fluid that has been filtered from the housing;
a support tube arranged in an interior of the housing and adapted to accommodate a filter element;
wherein the support tube extends along a housing axis of the housing and comprises a receiving side, wherein the support tube is connected to the housing by a first detent connection provided on the receiving side,
wherein the first detent connection is adapted to be detached only by being destroyed.

2. The filter system according to claim 1, wherein the first detent connection comprises a collar of a circumferential design at least in segments and at least one retaining tab facing the collar and interacting with the collar.

3. The filter system according to claim 2, wherein the at least one retaining tab has a retaining surface that is positioned perpendicularly relative to the housing axis.

4. The filter system according to claim 1, wherein the first detent connection comprises first detent elements arranged on the housing and second detent elements arranged on the support tube,
the first and second detent elements interacting with each other to establish the first detent connection.

5. The filter system according to claim 4, wherein the first detent elements comprise a collar of a circumferential design at least in segments and further comprise
at least one inwardly facing retaining tab with a retaining surface arranged on the collar,
wherein the at least one inwardly facing retaining tab is positioned perpendicularly to the housing axis.

6. The filter system according to claim 1, wherein the support tube is adapted to be axially mounted at a correct angle relative to the housing axis.

7. A filter system comprising:
a housing comprising a housing wall and at least one cover;
an inlet port arranged on the housing and adapted to supply a fluid to be filtered to the housing;
an outlet port arranged on the housing and adapted to discharge the fluid that has been filtered from the housing;
a support tube arranged in an interior of the housing and adapted to accommodate a filter element;
wherein the support tube extends along a housing axis of the housing and comprises a receiving side, wherein the support tube is connected to the housing by a first detent connection provided on the receiving side,
wherein the first detent connection comprises first detent elements arranged on the housing and second detent elements arranged on the support tube,
the first and second detent elements interacting with each other to establish the first detent connection,
wherein the first detent elements comprise a collar of a circumferential design at least in segments and further comprise
at least one inwardly facing retaining tab with a retaining surface arranged on the collar,
wherein the at least one inwardly facing retaining tab is positioned perpendicularly to the housing axis,
wherein the second detent elements comprise a circumferential collar and an outwardly facing retaining tab with a retaining surface arranged on the circumferential collar,
wherein the outwardly facing retaining tab is positioned perpendicularly relative to the housing axis, and
wherein the support tube comprises a securing element adapted to secure the detent connection against coming loose.

8. A filter system comprising:
a housing comprising a housing wall and at least one cover;
an inlet port arranged on the housing and adapted to supply a fluid to be filtered to the housing;
an outlet port arranged on the housing and adapted to discharge the fluid that has been filtered from the housing;
a support tube arranged in an interior of the housing and adapted to accommodate a filter element;
wherein the support tube extends along a housing axis of the housing and comprises a receiving side, wherein the support tube is connected to the housing by a first detent connection provided on the receiving side,
wherein the first detent connection comprises first detent elements arranged on the housing and second detent elements arranged on the support tube,
the first and second detent elements interacting with each other to establish the first detent connection,
wherein the second detent elements comprises
a first circumferential collar and
at least one inwardly facing retaining tab with a retaining surface arranged on the first circumferential collar,
wherein the at least one inwardly facing retaining tab is positioned perpendicularly to the housing axis.

9. The filter system according to claim 8, wherein the first detent elements comprise a second circumferential collar and an outwardly facing retaining tab with a retaining surface arranged on the second circumferential collar,
wherein the outwardly facing retaining tab is positioned perpendicularly relative to the housing axis, and
wherein the housing comprises a securing element adapted to secure the detent connection against coming loose.

10. A filter system comprising:
a housing comprising a housing wall and at least one cover;
an inlet port arranged on the housing and adapted to supply a fluid to be filtered to the housing;
an outlet port arranged on the housing and adapted to discharge the fluid that has been filtered from the housing;
a support tube arranged in an interior of the housing and adapted to accommodate a filter element;
wherein the support tube extends along a housing axis of the housing and comprises a receiving side, wherein the support tube is connected to the housing by a first detent connection provided on the receiving side, wherein the support tube comprises at least one alignment element arranged on the receiving side and wherein the housing has a counterelement interacting with the at least one alignment element and providing an anti-twist protection action when the support tube is mounted in the housing.

11. A filter system comprising:

a housing comprising a housing wall and at least one cover;

an inlet port arranged on the housing and adapted to supply a fluid to be filtered to the housing;

an outlet port arranged on the housing and adapted to discharge the fluid that has been filtered from the housing;

a support tube arranged in an interior of the housing and adapted to accommodate a filter element;

wherein the support tube extends along a housing axis of the housing and comprises a receiving side, wherein the support tube is connected to the housing by a first detent connection provided on the receiving side, the filter system further comprising a secondary element arranged in an interior of the support tube, wherein the secondary element extends along the housing axis and is adapted to be connected by a second detent connection to at least one of the support tube and the housing.

12. The filter system according to claim 11, wherein the secondary element is adapted to be axially mounted at a correct angle relative to the housing axis or the support tube.

13. The filter system according to claim 11, wherein the secondary element comprises at least one alignment element arranged on a receiving side of the secondary element, wherein the support tube comprises a counterelement interacting with the at least one alignment element and providing an anti-twist protection action when the secondary element is mounted in the support tube.

* * * * *